April 14, 1970     A. HILL ET AL     3,505,886

HAMMERING VIBRATOR

Filed June 11, 1968

United States Patent Office 3,505,886
Patented Apr. 14, 1970

3,505,886
HAMMERING VIBRATOR
Arne Hill, Gustav Adolfs vag 10B, Kalmar, Sweden, and Edvin Svante Lindell, Sundbyberg, Sweden; said Lindell, assignor to said Hill
Filed June 11, 1968, Ser. No. 736,217
Int. Cl. F16h *21/14*
U.S. Cl. 74—61                              4 Claims

ABSTRACT OF THE DISCLOSURE

A hammering vibrator includes a weight secured to one end of a lever which is swingably supported by two parallel and spaced shafts, one of which forms part of a driver rotatable about a fixed axis while the other is eccentrically located relative to said fixed axis to determine the direction of maximum thrust exerted by said swingable weight, the connection between said weight lever and one of said two shafts permitting a fulcrum displacement in the direction between the weight and the other connection. Preferably the connection permitting the fulcrum displacement is the one between the weight lever and said eccentrically located shaft.

---

This invention is concerned with a vibrator of the general type in which a weight is movable along a predetermined path at a varying speed under the actuation of a driver, which is adapted for continuous rotation about a fixed axis.

The main object of the invention is to provide an improved vibrator of the type referred to which is particularly well suited for ramming down, or drawing up, sheet piles or piling steels, e.g. in conjunction with foundation engineering, for driving crowbars, concrete breakers, rammers or tampers, and for similar purposes requiring pronounced blows or thrusts in a specific direction repeated at a normally moderate frequency. If it is then desirable to further increase the directional effect produced by each vibrator, this can, in a manner well known per se, be achieved by instead using a pair of identic vibrators of the type in question and by operating their weights synchronously but in opposite directions.

The main characterizing feature of a hammering vibrator embodying the invention is that the movable weight is secured to a weight lever which is rotatably connected to the driver as well as to a fixed shaft, which latter is eccentrically located relative to the axis of rotation of the driver, one of the said connections of the weight lever being of a kind permitting displacement of the fulcrum in the direction between the other connection and the weight. Preferably the fulcrum displacement is then achieved by the provision of a longitudinally extending slot in the weight lever passed by a fulcrum shaft parallel to the axis of rotation of the driver.

Such a design of the vibrator has proved especially advantageous for obtaining such high-amplitude blow or thrust forces which are required for the previously mentioned purposes, without having to make the vibrator very heavy or mechanically complicated.

In an embodiment of the invention preferred for the majority of tasks the said connection permitting the fulcrum displacement is the one between the weight lever and the fixed shaft, which latter is then serving as said fulcrum shaft. This will cause the weight to follow an especially favourable, closed path of motion, which is not circular but heart- or kidney-shaped, and at the same time a more compact construction is made possible.

Figure 1:
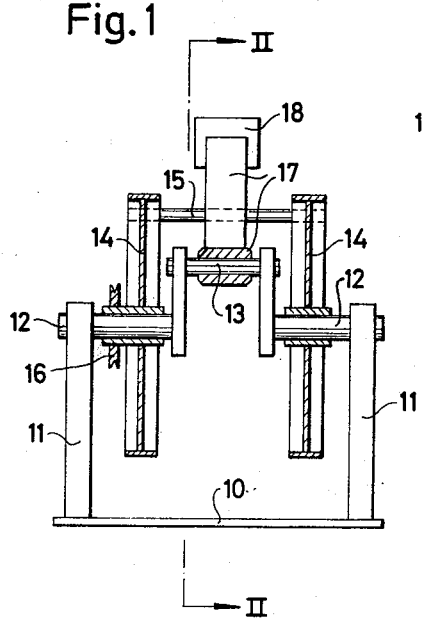
Figure 2:
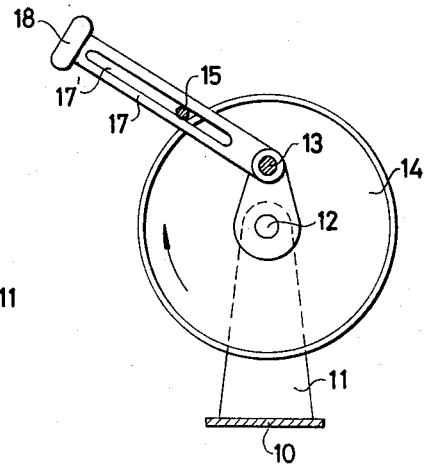
Figure 3:
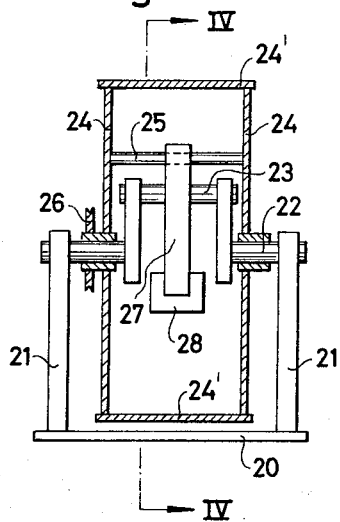
Figure 4:
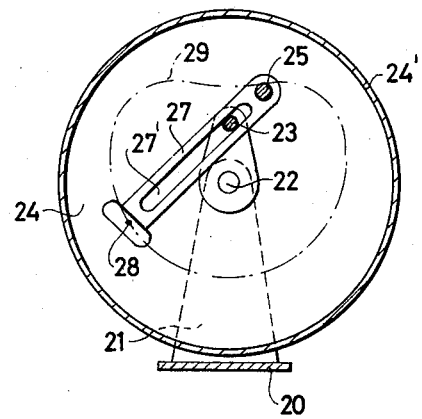

For further elucidation of the invention two different embodiments thereof will be described in the following text, reference being had therein to the accompanying drawing, wherein FIG. 1 is a sectional elevation of a first embodiment of the invention, FIG. 2 is a sectional elevation taken along the line II—II in FIG. 1, FIG. 3 is a sectional elevation of a second embodiment of the invention, and FIG. 4 is a sectional elevation taken along the line IV—IV in FIG. 3.

All the figures of the drawing are rather diagrammatic and do not show such obvious details as bearings and the like.

The hammering vibrator illustrated in FIGS. 1 and 2 is shown in a form exerting its largest force in the upward direction, so that it would thus be useful e.g. as a sheet pile extractor. It consists of a bottom plate 10 with two uprights 11 carrying between them a crankshaft 12 with an eccentrically located crank 13. In the case shown the crankshaft 12 is rigidly secured to the uprights 11, but, if the uprights had been higher, the crankshaft might as well have been rotary and lockably mounted in the latter, so that the crank 13 could be set into any desired angular position relative to the shaft 12, for instance downwardly directed, if flows or thrusts in that direction were required. Mounted to be freely rotatable about the end portions of the crankshaft 12 on either side of the crank 13 there are two flywheels 14, which are arranged to rotate synchronously and between which a shaft 15 is provided. One of the flywheels 14 is provided with a belt pulley 16 or the like for connection to a driving motor. Journalled on the crank 13 is the one end of a lever or arm 17, the other and free end of which carries a weight 18. The lever 17 is provided with a longitudinally extending slot 17' through which the shaft 15 between the flywheels 14 is passed, so that the weight 18 will be actuated to swing around, when the flywheels are rotating. Obviously the weight 18 will then rotate about the crank 13, i.e. it will describe a circular path and this with a cyclically varying angular velocity also when the flywheels rotate at a constant speed.

Obviously the flywheels 14 can, if desired, be made so much larger in outer diameter that the path of motion of the weight 18 will come entirely inside the periphery of the flywheels. In such a case the rim of both flywheels may be united by a sleeve or jacket, so that the weight 18 with its related level will be fully enclosed. However, the radial distance between the shaft 15 and the crankshaft 12 must then remain unchanged as long as the other conditions for the weight driving function of the flywheels are not altered.

The second form of the hammering vibrator embodying the invention, which has been illustrated in FIGS. 3 and 4, is structurally rather similar to that shown in FIGS. 1 and 2 but is, as a matter of fact, operating in a different manner. Also the vibrator of FIGS. 3 and 4 thus consists of a bottom plate 20 with two uprights 21, between which a non-rotating crankshaft 22 with an eccentrically located crank 23 is carried. A flywheel-like end piece 24 is rotatably mounted on each end portion of the crankshaft 12 and, as shown, these two end pieces are preferably interconnected by a jacket portion 24', so that a fully closed drum is formed. A shaft 25 is provided between the end pieces 24, and one of the end pieces 24 has on its outside a belt pulley 26 or the like for connection to a driving motor (not shown). A lever or arm 27 with a longitudinally extending slot 27' is secured to the weight 28, but, differently from the case shown in FIGS. 1 and 2, that end of the lever 27 which is remote from the weight 28 is here rotatably fixed on the shaft 25 that extends between the flywheel end pieces 24, while the crank 23 is passed through the slot 27' of the arm 27. This will cause the weight 28 to move along a substantially heart-shaped path 29. It should be noted that the vibrator of FIGS. 3 and 4 will develop a maximum force in the opposite direction as compared with the vibrator according to FIGS. 1 and 2, i.e. downwardly instead of upwardly in the form shown. The crank 23 then merely serves as a sort of guiding means for the arm 27 carrying the weight 28.

Also in the form of vibrator as shown in FIGS. 3 and 4 it is, of course, possible to mount the crankshaft 22 in the uprights 21 in such a rotatable and lockable manner that there is a possibility to change the direction of the maximum force by turning the crankshaft 22 and, hence, changing the angular position of the crank 23, which can very well be done also during the operation of the vibrator. In both the shown types of vibrator it is, of course, also possible to vary the difference in amplitude between the forces acting upwards and those acting downwards by varying the eccentricity of the crank 13 or 23 relative to its related crankshaft 12 and 22, respectively.

As will be readily understood, the bottom or base plate 10 or 20 of each vibrator as shown may be provided with suitable attachment means for the sheet pile, crowbar, tamper or the like, which should be actuated upon by the vibrator. Several modifications in size and details may also be made within the scope of the appended claims.

What is claimed is:

1. A hammering vibrator comprising in combination a supporting structure adapted to be rigidly connected to a means to be vibrated, a rotary driver mounted for continuous rotation by said supporting structure about an axis of rotation that is fixed relative to said supporting structure, means for rotating said driver, an elongated weight lever having a swing weight secured thereto, lever supporting pivot means on said supporting structure, said lever supporting pivot means having an axis parallel to but eccentrically located relative to said axis of rotation of the driver, lever driving pivot means eccentrically mounted on said driver and having an axis parallel to the axis of rotation of the driver, a first fulcrum connection between said weight lever and said lever supporting pivot means, a second fulcrum connection between said weight lever and said lever driving pivot means, one of said fulcrum connections being so constructed and arranged as to permit displacement of said one fulcrum in a direction extending longitudinally of said weight lever, and the other of said fulcrum connections being fixed relative to the said weight lever in the plane of swinging thereof.

2. A hammering vibrator according to claim 1 wherein said weight lever has a hole in the end thereof remote from said swing weight, said weight lever also including guiding means extending in a direction extending longitudinally of the weight lever, said guiding means forming a portion of said one fulcrum connection permitting displacement of the fulcrum in a direction extending longitudinally of said weight lever, said hole forming a portion of the other of said two fulcrum connections.

3. A hammering vibrator according to claim 2 wherein said guiding means comprises a longitudinally extending slot formed in said weight lever, said slot receiving a fulcrum shaft defining said lever driving pivot means.

4. A hammering vibrator according to claim 1 wherein said one fulcrum connection permitting displacement of the fulcrum in a direction extending longitudinally of said weight lever comprises the fulcrum connection between the weight lever and said lever supporting pivot means.

References Cited

UNITED STATES PATENTS

| 1,672,885 | 6/1928 | Goldschmidt | 74—61 |
| 2,069,031 | 1/1937 | Fergusson | 74—591 |
| 2,162,436 | 6/1939 | Hudson | 74—589 |
| 3,150,724 | 9/1964 | Oelkers | 74—61 |

FOREIGN PATENTS

| 138,556 | 2/1939 | Sweden. |
| 375,800 | 10/1939 | Italy. |

FRED C. MATTERN, Jr., Primary Examiner

W. S. RATLIFF, Jr., Assistant Examiner

U.S. Cl. X.R.

173—55